United States Patent Office.

GUSTAVUS ARND, OF NEW YORK, N. Y.

Letters Patent No. 70,386, dated November 5, 1867.

IMPROVED MODE OF TREATING TOBACCO.

*The Schedule referred to in these Letters Patent and making part of the same.*

TO ALL WHOM IT MAY CONCERN:

Be it known that I, GUSTAVUS ARND, of No. 441 Fifth street, New York, of the county and State of New York, have invented a new and useful Improvement in Treating Tobacco; and I do hereby declare that the following is a full, clear, and exact description thereof, which will enable those skilled in the art to make and use the same.

This invention consists in treating tobacco, after it has fermented, with acids, such as acetic acid, formic acid, malic acid, or lactic acid, in such a manner that, by the action of said acids, the ammonia formed in the tobacco during the process of fermentation is neutralized, and a tobacco is obtained which, when smoked, is free from the sharp, unpleasant taste peculiar to smoking-tobacco prepared in the usual manner.

The invention consists, also, in treating tobacco with vegetable substances, such as saccharine or other juices, and then exposing it to fermentation, in such a manner that, by the acetic and other acids produced by the fermentation of the vegetable substances, the ammonia formed in the tobacco during the process of fermentation is neutralized, and the tobacco rendered sweet and agreeable to smoke.

In carrying out my process, I either take fermented tobacco, and treat it either with one or the other or with a combination of the acids above specified, so that the ammonia formed in the tobacco during the process of fermentation is neutralized, or, instead of treating fermented tobacco with such acids, I treat the tobacco, whether fermented or unfermented, with vegetable substances, such as saccharine juices, cider, &c., which, when subjected to fermentation, will produce acetic or other similar acid, and then I subject the tobacco, together with the vegetable juices, to fermentation, so that the acid or acids formed by the fermentation of the vegetable juices will neutralize the ammonia formed in the tobacco during the process of fermentation. The fermentation may be facilitated by dry or wet heat, and the tobacco may be subjected to my process either in the leaf or after it has been granulated.

What I claim as new, and desire to secure by Letters Patent, is—

1. Treating tobacco with acids, such as acetic acid, formic acid, malic acid, lactic acid, or any other acid of a similar nature, substantially as and for the purpose described.

2. Treating tobacco with vegetable substances, such as saccharine or other juices, and then subjecting the same to fermentation, substantially as and for the purpose set forth.

GUSTAVUS ARND.

Witnesses:
W. HAUFF,
G. BERG.